US012707208B2

(12) United States Patent
Ma

(10) Patent No.: US 12,707,208 B2
(45) Date of Patent: Aug. 11, 2026

(54) METHOD AT A BINAURAL HEARING DEVICE SYSTEM AND A BINAURAL HEARING DEVICE SYSTEM

(71) Applicant: GN Hearing A/S, Ballerup (DK)

(72) Inventor: Changxue Ma, Barrington, IL (US)

(73) Assignee: GN HEARING A/S, Ballerup (DK)

( * ) Notice: Subject to any disclaimer, the term of this patent is extended or adjusted under 35 U.S.C. 154(b) by 197 days.

(21) Appl. No.: 17/704,480

(22) Filed: Mar. 25, 2022

(65) Prior Publication Data

US 2023/0328465 A1 Oct. 12, 2023

(51) Int. Cl.
*H04R 25/00* (2006.01)

(52) U.S. Cl.
CPC ......... *H04R 25/552* (2013.01); *H04R 25/407* (2013.01); *H04R 25/507* (2013.01); *H04R 25/554* (2013.01); *H04R 25/604* (2013.01); *H04R 25/609* (2019.05); *H04R 2225/41* (2013.01)

(58) Field of Classification Search
CPC .. H04R 25/552; H04R 25/407; H04R 25/507; H04R 2225/41
USPC .......... 381/23.1, 313
See application file for complete search history.

(56) References Cited

U.S. PATENT DOCUMENTS

| | | | | |
|---|---|---|---|---|
| 5,947,456 A * | 9/1999 | Aoki | F16F 13/26 267/140.13 |
| 10,425,745 B1 * | 9/2019 | Merks | H04R 25/407 |
| 10,715,933 B1 | 7/2020 | Ma et al. | |
| 2001/0031000 A1 * | 10/2001 | Nguyen | H03H 21/0012 375/232 |
| 2006/0153360 A1 * | 7/2006 | Kellermann | H04M 9/082 704/E21.007 |
| 2011/0188681 A1 * | 8/2011 | Kramer | H04R 29/006 381/313 |
| 2013/0243227 A1 * | 9/2013 | Kinsbergen | H04M 1/6016 381/314 |
| 2014/0006769 A1 * | 1/2014 | Chory | G06F 1/3203 713/100 |
| 2016/0302013 A1 * | 10/2016 | Andersson | H04R 25/305 |
| 2018/0109886 A1 * | 4/2018 | Nielsen | H04R 25/407 |
| 2019/0216393 A1 * | 7/2019 | Baheti | H01L 23/66 |
| 2019/0342660 A1 * | 11/2019 | Janse | H04R 1/406 |
| 2020/0137489 A1 * | 4/2020 | Sheaffer | H04R 5/04 |
| 2020/0162182 A1 * | 5/2020 | Zhang | H04J 11/0079 |

(Continued)

*Primary Examiner* — Katherine A Faley
(74) *Attorney, Agent, or Firm* — Vista IP Law Group, LLP

(57) ABSTRACT

Disclosed is a method at a binaural hearing device system, the system comprises a first hearing device for placement at, or in, a user's first ear, the first hearing device comprising a first acoustic input transducer arrangement, a first signal processor, and a first wireless communication interface; and a second hearing device for placement at, or in, the user's second ear, the second hearing device comprising a second acoustic input transducer arrangement, a second signal processor, and a second wireless communication interface. The method comprises, at a first signal processor, computing a first bilateral beamforming signal based on first and second monaural beamforming signals. Computing the first bilateral beamforming signal comprises an adaptive computation including a variable length FIR filter and a coefficient-based adaptation strategy.

33 Claims, 4 Drawing Sheets

(56) References Cited

U.S. PATENT DOCUMENTS

| | | | |
|---|---|---|---|
| 2021/0136501 | A1 | 5/2021 | Ma et al. |
| 2021/0289013 | A1* | 9/2021 | Bentaleb .......... H04N 21/44004 |

* cited by examiner

METHOD AT A BINAURAL HEARING DEVICE SYSTEM AND A BINAURAL HEARING DEVICE SYSTEM

FIELD

The present disclosure relates to a binaural hearing device system and related methods.

BACKGROUND

People in general, and, in particular, people with a hearing loss, experience difficulties understanding speech in noisy environments. In binaural listening mode, a user will naturally use the so-called "better ear listening strategy", which is listening to the signal with higher signal to noise ratio. The user will naturally take advantage of the head shadow effect for the better ear, which can be referred to as the focus ear. Further enhancement of signal-to-noise can be provided with a beamforming strategy for the focus ear.

Already existing binaural hearing device systems are effective in improving the signal to noise ratio of a binaurally beamformed microphone signal relative to the originating microphone signal or signals supplied by left ear and right ear microphone arrangements. The signal to noise ratio improvement of the binaurally beamformed microphone signal is caused by a high directivity index of the binaurally beamformed microphone signal which means that sound sources placed outside a relatively narrow angular range around a target direction, typically the user's frontal direction, are heavily attenuated or suppressed. Typically, the most effective noise suppression is seen against a noise source located near the designed null direction, i.e. 110 degree azimuthal. However, noise sources may come from any directions and may not be stationary. Furthermore, due to a narrow angular range in which sound sources remain substantially unattenuated may extend merely+/−20-40 degrees around the target direction, users have experienced a so-called 'tunnel effect'. This leads to a decreased spatial awareness for the user, and may, among other disadvantages, introduce listening fatigue and a reduced attention span. Thus, there is a need for an improved binaural hearing device system and related methods.

SUMMARY

Disclosed is a method at a binaural hearing device system. The system comprises a first hearing device for placement at, or in, a user's first ear. The first hearing device comprises a first acoustic input transducer arrangement, a first signal processor, and a first wireless communication interface. The system comprises a second hearing device for placement at, or in, the user's second ear. The second hearing device comprises a second acoustic input transducer arrangement, a second signal processor, and a second wireless communication interface. The method comprises, at the first signal processor, generating a first monaural beamforming signal based on one or more input transducer signals supplied by the first input transducer arrangement. The method comprises, at the first signal processor, receiving a second monaural beamforming signal from the second hearing device via the first wireless communication interface. The method comprises, at the first signal processor segmenting the first and second monaural beamforming signals into a number of signal blocks. The method comprises, at the first signal processor, configuring a variable length finite impulse response (FIR) filter to have a filter length comprising one or more filter coefficients. The method comprises, at the first signal processor, configuring a coefficient-based adaptation strategy wherein a number of the one or more filter coefficients is to be adapted per signal block. The method comprises, at the first signal processor, computing a first bilateral beamforming signal based on the first and second monaural beamforming signals. Computing the first bilateral beamforming signal comprises an adaptive computation including the variable length FIR filter and the coefficient-based adaptation strategy.

The method and apparatus as disclosed provides a flexible and adaptive method for binaural beamforming for hearing devices. It is an advantage that improved noise suppression is provided, at least compared to a fixed beamformer. It is an advantage that noise suppression for noise sources from different angles or locations is provided. It is an advantage that noise suppression is provided while mitigating the disadvantages of the so-called "tunnel effect" for the user. Thus, it is an advantage that a flexible way to achieve speech intelligibility improvement by strong beamforming, i.e. applying a high directivity index, in a noisy listening environment is provided, while also mitigate the co-called "tunnel effect" "sensation in less adverse listening environments via a controllable level of off-axis acoustic signal sources placed outside the target direction or target range such as to the sides of and behind the user.

Generally, herein the term 'on-axis' refers to a direction, or 'cone' of directions, relative to one or both of the hearing devices at which directions the directional signals are predominantly captured from. That is, 'on-axis' refers to the focus area or focus beam of one or more beamformer(s) or directional microphone(s). This focus area or focus beam is usually, but not always, in front of the user's face, i.e. the 'look direction' of the user. In some aspects, one or both of the first and second hearing devices capture the respective directional signals from a direction in front, on-axis, of the user. The term 'off-axis' refers to all other directions than the 'on-axis' directions relative to one or both of the first and second hearing devices. The term 'target sound source' or 'target source' refers to any sound signal source which produces an acoustic signal of interest e.g. from a human speaker. A 'noise source' refers to any undesired sound source which is not a 'target source'. For instance, a noise source may be the combined acoustic signal from many people talking at the same time, machine sounds, vehicle traffic sounds etc.

Although the following description uses terms "first," "second," etc. to describe various elements, these elements should not be limited by the terms. These terms are only used to distinguish one element from another.

The method is configured to be performed at or by the binaural hearing device system. The method may be a method of processing an audio signal.

The system comprises the first hearing device for placement at, or in, the user's first ear. Thus, the first hearing device may have a intended operation position at, or in, the user's first ear. The system comprises the second hearing device for placement at, or in, the user's second ear. Thus, the second hearing device may have a intended operation position at, or in, the user's second ear. In an embodiment, the first and/or the second hearing device is configured to be worn by the user. The first and/or second hearing device may be arranged at the user's ear, on the user's ear, over the user's ear, in the user's ear, in the user's ear canal, behind the user's ear and/or in the user's concha, i.e., the first and/or second hearing device is configured to be worn in, on, over and/or at the user's ear. The user may wear the first hearing device at one ear, and the second hearing device at the other ear. The first and the second hearing devices in the binaural hearing device system may be connected, such as wirelessly connected and/or connected by wires. The binaural hearing device system may be a binaural hearing aid system.

The first and/or second hearing device may be a hearable such as a headset, headphone, earphone, earbud, hearing aid, a personal sound amplification product (PSAP), an over-the-counter (OTC) hearing device, a hearing protection device, a one-size-fits-all hearing device, a custom hearing device or another head-wearable hearing device. Hearing devices can include both prescription devices and non-prescription devices. The second hearing device may be configured to be operated in a same way as the first hearing device, or in another way. The first and second hearing device may be configured to compensate for a hearing loss of the user. Alternatively, the first and second hearing devices may be configured without compensating for a hearing loss. The first and/or second hearing devices may be configured to one or more of: protect against loud sound levels in the surroundings, playback of audio, communicate as a headset for telecommunication, and to compensate for a hearing loss.

The first and/or second hearing device may be embodied in various housing styles or form factors. Some of these form factors are Behind-the-Ear (BTE) hearing device, Receiver-in-Canal (RIC) hearing device, Receiver-in-Ear (RIE) hearing device or Microphone-and-Receiver-in-Ear (MaRIE) hearing device. These devices may comprise a BTE unit configured to be worn behind the ear of the user and an in the ear (ITE) unit configured to be inserted partly or fully into the user's ear canal. Generally, the BTE unit may comprise at least one input transducer, a power source and a processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE, RIC and MaRIE hearing devices refer to hearing devices where the receiver may be comprised in the ITE unit, which is coupled to the BTE unit via a connector cable or wire configured for transferring electric signals between the BTE and ITE units.

Some of these form factors are In-the-Ear (ITE) hearing device, Completely-in-Canal (CIC) hearing device or Invisible-in-Canal (IIC) hearing device. These hearing devices may comprise an ITE unit, wherein the ITE unit may comprise at least one input transducer, a power source, a processing unit and an output transducer. These form factors may be custom devices, meaning that the ITE unit may comprise a housing having a shell made from a hard material, such as a hard polymer or metal, or a soft material such as a rubber-like polymer, molded to have an outer shape conforming to the shape of the specific user's ear canal.

Some of these form factors are earbuds, on the ear headphones or over the ear headphones. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

The first hearing device comprises the first acoustic input transducer arrangement. The second hearing device comprises the second acoustic input transducer arrangement. In an embodiment, each of the first and second acoustic input transducer arrangements may comprise at least two omnidirectional acoustic input transducers, such as at least two omnidirectional microphones, and a beamformer including beamforming processors to generate a directional signal. Alternatively, or additionally, each of the first and second acoustic input transducer arrangements may comprise a directional acoustic input transducer arrangement, such as a directional microphone arrangement. Thus, in other words, each of the first and second the hearing device may comprise one or more input transducers. The one or more input transducers may comprise one or more vibration sensors configured for detecting bone vibration. The one or more input transducer(s) may be configured for converting an acoustic signal into a first electric input signal, or electric microphone signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

The first hearing device comprises the first wireless communication interface. The second hearing device comprises the second wireless communication interface. In an embodiment, each of the first and/or second hearing device may comprise one or more antenna(s) configured for wireless communication. In other words, each of the first and/or second wireless communication interface may comprise one or more antenna(s). Thus, the first hearing device may be configured to communicate wirelessly via the first wireless communication interface via one or more antenna(s), and the second hearing device may be configured to communicate wirelessly via the second wireless communication interface via one or more antenna(s). The one or more antenna(s) may be configured for emitting and receiving electromagnetic radiation. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The electric antenna may be any antenna capable of operating at these frequencies, and the electric antenna may be a resonant antenna, such as monopole antenna, such as a dipole antenna, etc. The resonant antenna may have a length of $\lambda/4\pm10\%$ or any multiple thereof, A being the wavelength corresponding to the emitted/received electromagnetic field/radiation. Additionally, or alternatively, the one or more antenna(s) may comprise a magnetic or magnetic induction antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the first and/or second hearing device may comprise one or more wireless communication unit(s). In other words, the first and/or second wireless communication interface may comprise one or more wireless communication unit(s). Thus, the first hearing device may be configured to communicate wirelessly via the first wireless communication interface via one or more wireless communication unit(s), and the second hearing device may be configured to communicate wirelessly via the second wireless communication interface via one or more wireless communication unit(s). The one or more wireless communications unit(s) are configured for wireless data communication, and in this respect interconnected with the one or more antennas for emission and reception of the electromagnetic field. The electromagnetic field being the field/radiation emitted and/or received by the one or more antenna(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The first and/or second hearing device may be configured for wired/wireless audio communication, e.g. enabling the user to listen to media, such as music or radio and/or enabling the user to perform phone calls.

In an embodiment, the wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from the other hearing device in the binaural hearing device system, such as a contra-lateral hearing device or the second hearing device, and/or from one or more accessory device(s), such as a smartphone and/or a smart watch. Thus, the first and second wireless communication interfaces may be configured for communicating with each other. Additionally, each of the first and second wireless communication interfaces may be configured for wireless communication an external device, such as an electronic device, a computer, a smartphone or a remote control. The wireless communication between the first and/or second hearing devices and/or with the external device may be in accordance with a power saving data protocol, and transmitted signals may be in a digitally encoded format e.g. as real-time digital audio streams in accordance with the a data protocol of the first and second wireless communication interfaces.

The first hearing device comprises the first signal processor or first processing unit. The second hearing device comprises the second signal processor or second processing unit. The term signal processor and processing unit may be used interchangeably in the following. The first and/or second processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The first and/or second processing unit may be a processor, an integrated circuit, an application, functional module, etc. The first and/or second processing unit may be implemented in a signal-processing chip or a printed circuit board (PCB). The first and/or second signal processor may comprises a post processing filter and/or a hearing loss compensation unit. In some embodiments the post processing filter is omitted or at least temporarily dispensed with or by-passed. In some embodiments, the hearing loss compensation unit is omitted or by-passed. The first and/or second signal processor may comprise a controller, wherein the first monaural beamforming signal and the second monaural beamforming signal may be input to the controller. The controller may be configured to configure the variable length finite impulse response (FIR) filter to have a filter length comprising one or more filter coefficients. The controller may be configured to configure the coefficient-based adaptation strategy wherein a number of the one or more filter coefficients is to be adapted per signal block. The first and/or second processing unit may comprise a multiplier-accumulator (MAC) unit configured to perform a MAC operation. Typically, in digital signal processing, a MAC operation is a step that computes the product of two numbers and adds that product to an accumulator. The first and/or second processing unit may be configured to provide a first electric output signal based on the processing of the first and/or second electric input signal(s). The first and/or second processing unit may be configured to provide a second electric output signal. The second electric output signal may be based on the processing of the first and/or second electric input signal(s).

In an embodiment, the first and/or second hearing device may comprise an output unit. The output unit may comprise an output transducer. The first bilateral beamforming signal may be provided to the user via the output unit comprising the output transducer. The output unit or the output transducer may be coupled to the processing unit in each of the first and/or second hearing devices. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the processing unit via the magnetic antenna. The output transducer may be comprised in an ITE unit or in an earpiece, e.g. Receiver-in-Ear (RIE) unit or Microphone-and-Receiver-in-Ear (MaRIE) unit, of the first and/or second hearing device. One or more of the input transducer(s) may be comprised in an ITE unit or in an earpiece.

In an embodiment, the first and/or second wireless communication unit may be configured for converting the second electric output signal into a wireless output signal. The wireless output signal may comprise synchronization data. The first and/or second wireless communication unit may be configured for transmitting the wireless output signal via at least one of the one or more antennas.

In an embodiment, the first and/or second hearing device may comprise a digital-to-analogue converter configured to convert the first electric output signal, the second electric output signal and/or the wireless output signal into an analogue signal.

In an embodiment, the first and/or second hearing device may comprise a vent. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

In an embodiment, the first and/or second hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the first and/or second hearing device may comprise a memory, including volatile and non-volatile forms of memory.

The method comprises, at the first signal processor, generating a first monaural beamforming signal based on one or more input transducer signals supplied by the first input transducer arrangement. The first monaural beamforming signal may be provided or generated or computed using a first beamforming algorithm at the first signal processor. Typically, a larger spacing or distance between sound inlets of an acoustic input transducer arrangement improves the directionality and directional index (DI) of the resulting monaural beamforming signal. Thus, for the first acoustic input transducer arrangement, a larger spacing between respective sound inlets of at least two omnidirectional acoustic input transducers or a larger spacing between first and second sound inlets of a directional microphone may improve the directionality and DI of the first monaural beamforming signal.

The method comprises, at the first signal processor, receiving a second monaural beamforming signal from the second hearing device via the first wireless communication interface. The second monaural beamforming signal may be provided or generated or computed by the second signal processor based on one or more input transducer signals supplied by the second input transducer arrangement at the second hearing device. The second monaural beamforming signal may be provided or generated or computed using a second beamforming algorithm at the second signal processor. Similarity to the first acoustic input transducer arrangement as discussed above, for the second acoustic input transducer arrangement, a larger spacing between respective sound inlets of at least two omnidirectional acoustic input transducers or a larger spacing between first and second sound inlets of a directional microphone may improve the directionality and DI of the second monaural beamforming signal.

The second monaural beamforming signal may be wirelessly communicated via the second and first wireless communication interfaces, respectively. Thus, the second monaural beamforming signal may be transmitted from the second hearing device via the second wireless interface to the first hearing device via the first wireless interface.

The method comprises, at the first signal processor segmenting the first and second monaural beamforming signals into a number of signal blocks. The first and second monaural beamforming signals may comprise a number of signal blocks, the number of signal blocks may be between 16 and 96, preferably 32. The signal blocks may be time-domain signal blocks.

The method comprises, at the first signal processor, configuring the variable length finite impulse response filter (hereafter denoted a FIR filter) to have a filter length comprising one or more filter coefficients. Thus, in other words, the variable length FIR filter may be configured, or generated or computed to have or comprise the filter length comprising filter coefficients or one or more coefficients. The FIR filter may be implemented by using the MAC unit of the signal processor. Typically, a FIR filter is known as a filter whose impulse response (or response to any finite length input) is of finite duration, because it settles to zero in finite time—this is in contrast to infinite impulse response (IIR) filters, which may have internal feedback and may continue to respond indefinitely (usually decaying). The variable length FIR filter may be a digital filter. Typically, a filter length of a FIR filter is defined by the number of filter coefficients. The one or more filter coefficients may also be referred to as filter coefficient, filter taps or one or more filter taps. The one or more filter coefficients may be one (1) coefficient. The one or more filter coefficients may be 2, 3, 4, 5, 6, 7, 8, 9, 10, 11, 12, 13, 14, 15, 16, 17, 18, 19 or 20 or more filter coefficients. Typically, the longer the filter length (more coefficients), the more finely the response of the FIR filter can be tuned. Typically, a FIR filter with more coefficients may result in a narrower or more focused focus beam for the first bilateral beamforming signal than a FIR filter with less coefficients. Typically, computation involving a FIR filter with more coefficients may require more computational power than any computation with a FIR filter with less coefficients. Typically, the convergence speed and noise suppression may be more frequency dependent to compensate for the frequency dependence of the head shadow effects.

The method comprises, at the first signal processor, configuring the coefficient-based adaptation strategy, wherein the number of the one or more filter coefficients is adapted or is to be adapted per signal block. Thus, in other words, the method may comprise, at the first signal processor, configuring the coefficient-based adaptation strategy wherein one or more of the one or more filter coefficients is to be adapted per signal block. Also, in other words, the method may comprise, at the first signal processor, configuring the coefficient-based adaptation strategy to comprise the number of the one or more filter coefficients to be adapted per signal block. The number of the one or more filter coefficients to be adapted per signal block may be a same number as the one or more coefficients, or it may be a lower number that the one or more coefficients. For example, if the one or more filter coefficients is four (4) filter coefficients, the number of the one or more filter coefficients to be adapted per signal block may be 1, 2, 3, or 4. Similarity, for example, if the one or more filter coefficients is eight (8) filter coefficients, the number of the one or more filter coefficients to be adapted per signal block may be 1, 2, 3, 4, 5, 6, 7, or 8. If the number of the one or more filter coefficients to be adapted per signal block is lower or less than the one or more coefficients, the other or remaining coefficients may be set to 0 (zero). Typically, adapting a lower number of filter coefficients per signal block may have a slower convergence speed than adapting a higher number of filter coefficients per signal block. Typically, adapting a lower number of filter coefficients per signal block may require less computational power than adapting a higher number of filter coefficients per signal block. Configuring the coefficient-based adaptation strategy may comprise updating the coefficients in the number of the one or more filter coefficients to be adapted per signal block in the FIR filter. Updating the coefficients in the number of the one or more filter coefficients to be adapted per signal block in the FIR filter may be performed for one coefficient at a time. In other words, updating the number of the one or more filter coefficients to be adapted per signal block may be performed iteratively using a counter, until all of the coefficients of the number of the one or more filter coefficients to be adapted per signal block has been updated or adapted. Updating the coefficients in the number of the one or more filter coefficients to be adapted per signal block in the FIR filter may be performed by using the optimization algorithm(s) discussed below.

The method comprises, at the first signal processor, computing a first bilateral beamforming signal based on the first and second monaural beamforming signals.

Computing the first bilateral beamforming signal comprises an adaptive computation including the variable length FIR filter and the coefficient-based adaptation strategy.

Thus, rather than computing the first bilateral beamforming signal based on a FIR filter with a fixed length, it is an advantage that the first bilateral beamforming signal is computed based on the variable length FIR filter, such that the extend of the focus beam of the first bilateral beamforming signal may be varied.

Furthermore, rather than computing the first bilateral beamforming signal using all filter coefficients per signal block for all signal blocks, i.e. every time or all the time, it is an advantage that the computation uses the coefficient-based adaptation strategy, configured to comprise the number of the one or more filter coefficients to be adapted per signal block, such that less computing power may be required if the number is lower than the one or more filter coefficients, compared to the required computing power if all of the one or more filter coefficient are adapted or are to be adapted per signal block. Doing so may also lower a speed of convergence for the computation of the first bilateral beamforming signal. However, because it is desirable or an advantage that the speed of convergence for the computation of the first bilateral beamforming signal is slowed down to provide a smooth transition between different listening environments, the lower convergence speed is not an disadvantage but is also seen as desirable effect or an advantage.

In some embodiments, the configuration of the variable length FIR filter to have the filter length comprising one or more filter coefficients may be recurrently updated or recurrently configured. In some embodiments, the configuration of the coefficient-based adaptation strategy including the number of the one or more filter coefficients to be adapted per signal block may be recurrently updated or recurrently configured. Computing the first bilateral beamforming signal may comprise the adaptive computation including the most recent or updated values and/or configurations of the variable length FIR filter and the coefficient-based adaptation strategy.

In some embodiments, the variable length FIR filter is configured to equalize the first monaural beamforming signal and the second monaural beamforming signal. The variable length FIR filter may be configured to equalize signals from the first and second monaural beamforming signals according to the function:

$$S=\operatorname{argmax}_{l,r,v}(\mathrm{SNR}(l),\mathrm{SNR}(r),\mathrm{SNR}(v=\alpha * l+(1-\alpha)*r)), \quad (1)$$

wherein S is the first bilateral beamforming signal, SNR is signal-to-noise ratio, a is a transfer function of the variable length FIR filter, * denotes the convolution operation, and/and r is the first and second monaural beamforming signals, respectively. Equalizing the first monaural beamforming signal and the second monaural beamforming signal using the variable length FIR filter may also be described as scaling the first monaural beamforming signal to be equal in strength to the second monaural beamforming signal by use of the variable length FIR filter, or vice versa. It is an advantage that the variable length FIR filter is configured to equalize the head-shadow effect and the beamforming differences between the first monaural beamforming signal and the second monaural beamforming signal in order to achieve optimal off-axis source suppression while maintaining signals from the front. Hereby, improved noise reduction may be provided. In particular, a noise signal source emitting a signal, even a strong signal, which correlates only poorly between the first monaural beamforming signal and the second monaural beamforming signal may be suppressed.

Formula 1 above can be simplified as:

$$S=\operatorname{argmin}_{l,r,v}(\mathrm{rms}(l),\ \mathrm{rms}(r),\ \mathrm{rms}(v=\alpha * l+(1-\alpha)*r)), \quad (2)$$

where rms represent the root mean square value. To find the argument of the minimum (argmin) values, the optimal a value should be obtained. This is equivalent to solve for α and β in the following:

$$S=\{\operatorname{argmin} E(\alpha * l+\beta * r)\cdot(\alpha * l+\beta * r)\} \quad (3)$$

under the constraints that $$\alpha(i)+\beta(i)=\delta(i) \text{ and } \delta(n)=\begin{cases}1, & n=0\\ 0, & n\neq 0\end{cases}, \quad (4)$$

Where E indicates the expectation of the energy of a signal block, the variable length FIR filter is described by α(i) and β(i) being two finite impulse sequences with i=0, 1, . . . , M−1, and l and r indicates sequences l(n) and r(n) with n=0, 1, 2, . . . , N−1.

To understand the constraints given in formula 4, let $l^a$, $r^a$, $l^b$ and $r^b$ be signals emitted from two sources a and b, where source a is located in front of the user and source b is an off-axis source. For source a, $l^a=l^b$. Therefore:

$$S=\{\operatorname{argmin} E\{(\alpha*(l^a+l^b)+\beta*(r^a+r^b))\cdot(\alpha*(l^a+l^b)+\beta*(r^a+r^b))\}\}, \quad (5)$$

which under the constraint given in formula 4 above becomes $$S=\{\operatorname{argmin} E\{((l^a+r^a)+(\alpha*l^b+\beta*r^b))\cdot\{(l^a+r^a)+(\alpha*l^b+\beta*r^b)\}\}\}. \quad (6)$$

It is seen that α(i) and β(i), which describes the variable length FIR filter, has no effect on the signal emitted from source a located in front of the user, but is only applied to the off-axis source b.

The solution to solving for α and β in formula 3 is obtained adaptively by minimizing the following cost functions C as follows:

$$C(\alpha,\beta)=\min_{\alpha,\beta}\{E\{(\alpha*l+\beta*r)\cdot(\alpha*l+\beta*r)+\lambda(\alpha+\beta-\delta(n))\}\}, \quad (7)$$

where λ is the Lagrange multiplier.

To do this we use the stochastic steepest descent algorithm. Take Gradient $$\nabla C(\alpha,\beta)=2\begin{Bmatrix}E\{v(n)\cdot l(n-i)\}+\lambda\\ E\{v(n)\cdot r(n-i)\}+\lambda\end{Bmatrix}$$

with respect to each FIR filter coefficient.

To solve Lagrange, by ∇C(α, β)=0, we obtain:

$$\lambda=\frac{1}{2}(E\{r(n-i)\cdot v(n)\}+E\{l(n-i)\cdot v(n)\}),$$

where $$v(n)=\alpha*l+\beta*r.$$

The solution is then:

$$\begin{pmatrix}\alpha_{m+1(i)}\\ \beta_{m+1(i)}\end{pmatrix}=\begin{pmatrix}\alpha_{m(i)}\\ \beta_{m(i)}\end{pmatrix}-\mu\cdot\begin{Bmatrix}dcc(i)\\ -dcc(i)\end{Bmatrix},$$

where μ is step size, i=0, 1 . . . M−1, m=0, 1, . . . , where m is the time index of the signal blocks starting with the start of a mode and ending when the mode changes, and where $$dcc(i)=E\{v(n)\cdot(l(n-i)-r(n-i))\}$$

are cross-correlation coefficients with lag i between beamforming output signals with the difference of signals l and r.

To present block processing explicitly, we have $$dcc(i) == E\left\{\sum_{n=0}^{N-1} v(n)\cdot(l(n-i)-r(n-i))\right\}.$$

The least mean square (LMS) solution is:

$$\begin{pmatrix}\alpha_{m+1(i)}\\ \beta_{m+1(i)}\end{pmatrix}=\begin{pmatrix}\alpha_{m(i)}\\ \beta_{m(i)}\end{pmatrix}-\mu\cdot\begin{Bmatrix}dcc(i)\\ -dcc(i)\end{Bmatrix}.$$

To normalize the cross-correlation coefficient with beamforming signal energy, we obtain the normalized least mean square (NLMS) algorithm:

$$\begin{pmatrix}\alpha_{n+1(i)}\\ \beta_{n+1(i)}\end{pmatrix}=\begin{pmatrix}\alpha_{n(i)}\\ \beta_{n(i)}\end{pmatrix}-\frac{\mu\cdot\begin{Bmatrix}dcc(i)\\ -dcc(i)\end{Bmatrix}}{E(v\cdot v)}.$$

Because α(i)+β(i)=δ(i), we only need to compute α or β. The expectation is calculated with a temporal recursive smoothing technique such as:

$$y(n+1)=\rho y(n)+(1-\rho)x,$$

where ρ is a time constant, 0<ρ<1, e.g. 0.9. The update is performed when (v·v)>0.

In some embodiments, the adaptive computation using the variable length FIR filter is a time-domain adaptive computation. The time-domain adaptive computation may comprise time-domain convolutions and time-domain cross-correlations. Typically, a frequency-domain computation utilizing a Fast Fourier Transform (FFT) could be more efficient and have a higher speed of convergence for the computation. However as discussed in the present disclosure, the inventors have found it desirable to have smooth transition between different listening environments or acoustic situations, i.e. when the user moves from one location to another or if a listening environment changes in the same location, it is considered desirable or an advantage that the speed of the convergence for the computation is slower.

Considering the short length of filter and filter blocks, a direct time-domain implementation may be based on the MAC unit in the signal processor. The adaptive computation may be coefficient-based.

For each incoming signal block, $l^p$ and $r^p$, where p goes from 0, 1, 2 . . . , instead of computing the cross-correlations as $$dcc(i)=E\{v(n)\cdot(l^p(n-1)-r^p(n-1))\}$$

for all coefficients, i=0, 1, 2, . . . M, we can adapt one coefficient per signal block and compute the cross-correlation coefficient as follows:

$$dcc(\mathrm{mod}(p,M))=E\{v(n)\cdot(l^p(n-\mathrm{mod}(p,M))-r^p(n-\mathrm{mod}(p,M)))\},$$

for p=0, 1, 2, . . . , where mod(p, M) is a modulo operation.

In addition or alternatively to adapting just one coefficient per signal block, more than one coefficients may be adapted per signal block. Thus, one or more coefficients may be adapted per signal block.

In some embodiments, the coefficient-based adaptation strategy comprises a value representing the number of the one or more filter coefficients to be adapted per signal block. Thus, if the number of the one or more filter coefficients to be adapted per signal block is four (4), the value representing the number of the one or more filter coefficients to be adapted per signal block is four (4).

In some embodiments, the method comprises receiving a request for engaging in a hearing mode. The hearing mode may be a first hearing mode, a second hearing mode, an optimization mode, or an additional hearing mode in one more additional hearing modes, as discussed in the present disclosure. The hearing mode may comprise a filter length and/or one or more parameters for the coefficient-based adaptation strategy. In some embodiments, the method comprises, in response to the request for engaging in the hearing mode, engaging in the hearing mode. In some embodiments, the method comprises, detecting the hearing mode in which the first hearing device is engaged.

In some embodiments, the method further comprises receiving a request for engaging in an optimization mode, wherein a current listening environment is determined. The current listening environment may be determined using or based on the signals from the first and second acoustic input transducer arrangements.

A listening environment—or an acoustic situation—may be defined as the audio signals or sounds that are emanating from or are present in the vicinity or the near environment of the user. The listening environment may change depending on the user's location and may change throughout the day. For example for the user, the day can start off relatively quiet as the user wakes up. This situation creates one kind of listening environment. The user may commute to work in an environment that combines car background noise and conversations at the bus stop. This situation creates another kind of listening environment. Then, after work, the user may frequent a bar or a noisy restaurant while out with friends. This situation creates yet another kind of listening environment. The current listening environment may be defined as the listening environment that the user is currently in or surrounded by.

The current listening environment may be determined using machine learning. The machine learning may be a deep neural network (DNN) acoustic scene analyzer using or based on the signals from the first and second acoustic input transducer arrangements.

The optimization mode may thus be described as a hearing mode wherein the binaural hearing device system "actively listens" to sounds or acoustic signals emanating from the user's surroundings, and the determination of the current listening environment is made. The determination of the current listening environment may for example comprise determining the noise level, the amplitude or strength of the sounds, the number of sound sources, the angle at which the sounds are received from etc. The determination of the current listening environment may comprise that the current listening environment may be categorized or classified as a particular listening environment category. It is an advantage that the current listening environment is determined is provided, such that the binaural hearing device system may take the current listening environment into consideration when computing the first bilateral beamforming signal.

The skilled person will understand that the disclosed examples given for the considerations for the filter length and the value representing the number of the one or more filter coefficients to be adapted per signal block are merely illustrative examples and that the disclosed method provides both effective off-axis noise suppression as well as situational awareness at the same time. Thus, the disclosed examples merely illustrate a trade off in the considerations for a shorter relative to a longer filter length, and similarity for a lower relative to a higher value representing the number of the one or more filter coefficients to be adapted per signal block.

In some embodiments, the method further comprises engaging in a first hearing mode, wherein the filter length is a first filter length configured to be a predetermined default filter length, and wherein the value representing the number of the one or more filter coefficients to be adapted per signal block is a first value configured to be a predetermined default value. The first filter length comprises one or more filter coefficients. The first filter length may be a filter length assigned to the variable length FIR filter when no specific filter length is explicitly assigned otherwise. The first value may be the value representing the number of the one or more filter coefficients to be adapted per signal block when no specific value is explicitly assigned otherwise. The first hearing mode may be a default hearing mode when no other hearing mode is assigned or selected. The first hearing mode may be determined or configured or set or provided during manufacturing or during a fitting session with hearing care professional. The first hearing mode may be a fixed hearing mode in that the first filter length and the first value cannot be updated, or the first hearing mode may be a dynamic hearing mode that can be updated, for example during a software update of the binaural hearing device system or the first hearing device, or during a visit to a hearing case professional. The first hearing mode may be adjusted to the user's specific needs and/or preferences, which may depend on both the user and the current noise conditions. Some users may tolerate higher noise levels, while other users may tolerate lower noise levels. For example, for some users, it may be preferable that the first filter length is a relatively longer filter length, such that the resulting focus beam of the first bilateral beamforming signal is narrower, effectively suppressing any sources from the side or off-axis. For other users, it may be preferable that the first filter length is a relatively shorter filter length, such that a high degree of situational awareness can be achieved. For example, for some users, it may be preferable that the first value is relatively low, ensuring a slow transition between different listening environments. For other users, it may be preferable that the first value is relatively high, such that the adaptive computation occurs faster with less computation time. Because the user's specific needs and/or preferences may change over time, the first hearing mode may be updated to accommodate such changes.

It is an advantage that the first hearing mode having the predetermined default filter length and the predetermined default is provided, such that the hearing device always can use this hearing mode when no other hearing mode is assigned or selected.

In some embodiments, the optimization mode comprises, based on the determined listening environment or the determined current listening environment, determining a second filter length comprising one or more filter coefficients. The second filter length may be different from the first filter length. If determined that a filter length equal to the first filter length is the optimum filter length for the determined listening environment, the second filter length may be equal to the first filter length. If the determined listening environment is a listening environment that requires a high degree of situational awareness, for example when a user is cycling or biking in traffic, the second filter length may be determined to be relatively low. If the determined listening environment is a listening environment that requires a high degree of suppressing sounds from off-axis sources, for example when engaging in conversation with another person in a noisy environment such as a restaurant, the second filter length may be determined to be relatively high.

It is an advantage that the determination of the second filter length is based on the determined listening environment or the determined current listening environment, such that the binaural hearing device system may take the current listening environment into consideration when computing the first bilateral beamforming.

In some embodiments, the determination of the second filter length comprising one or more filter coefficients is performed using machine learning. The machine learning for determining the second filter length may for example be a Markov model, a neural network or a statistical method. It is an advantage of using machine learning for the determination of the second filter length, because it provides that the determination is automated and may provide improved accuracy and efficiency.

In some embodiments, the optimization mode comprises, based on the determined listening environment, determining a second value representing the number of the one or more filter coefficients to be adapted per signal block. The second value may be different from the first value. If determined that the first value is an optimum or preferable value, such as for the determined listening environment, the second value may be equal to the first value. If the determined listening environment is a listening environment that requires a high degree of situational awareness, for example when a user is cycling or biking in traffic, it may be preferable to favor a short computation time, such that the second value may be determined to be relatively high. If the determined listening environment is a listening environment that requires a high degree of suppressing sounds from off-axis sources, for example when engaging in conversation with another person in a noisy environment such as a restaurant, it may be preferable to favor a longer computation time, such that the second value may be determined to be relatively low. It is an advantage that the determination of the second filter value is based on the determined listening environment or the determined current listening environment, such that the binaural hearing device system may take the current listening environment into consideration when computing the first bilateral beamforming.

In some embodiments, the determination of the second value representing the number of the one or more filter coefficients to be adapted per signal block is performed using machine learning. The machine learning for determining the second value representing the number of the one or more filter coefficients to be adapted per signal block may for example be a Markov model, a neural network or a statistical method. It is an advantage of using machine learning for the determination of the second filter value, because it provides that the determination is automated and may provide improved accuracy and efficiency.

In some embodiments, the method further comprises a second hearing mode, wherein the filter length is the second filter length. Additionally or alternatively, in some embodiments, the value representing the number of the one or more filter coefficients to be adapted per signal block is the second value. Thus, the second filter length and/or the second value determined during the optimization mode may be implemented in the second hearing mode. It is an advantage that the method further comprises the second hearing mode with the second filter length and/or second value, because this further improves the flexible and adaptive manner of providing bilateral beamforming for hearing devices provided by the claimed method.

In some embodiments, the optimization mode is a part of the second hearing mode, such that the current listening environment is determined in the second hearing mode, and further that the second filter length and the second value is both determined and implemented in the second hearing mode. Alternatively, or additionally, in some embodiments, the optimization mode is a part of the first hearing mode, such that the current listening environment is determined in the first hearing mode, and further that the second filter length and the second value is also determined in the first hearing mode, while the first filter length and the first value are implemented. Then, in some embodiments, the method further comprises determining if the first hearing mode should be maintained, or if the second hearing mode should be engaged such that the second filter length and the second value may be implemented. Thus, in some embodiments, the optimization mode is not a separate mode in itself, but either occurs concurrently or is a part of the first hearing mode and/or the second hearing mode.

In some embodiments, the request for engaging in the first hearing mode is received in response to a user input. Additionally or alternatively, in some embodiments, the request for engaging in the optimization mode is received in response to a user input. Additionally or alternatively, in some embodiments, the request for engaging in the second hearing mode is received in response to a user input. The user input may be via e.g. an affordance provided on the first and/or second hearing device, or via a wireless interface, e.g. from an external device such as remote control or smart phone. If the user input is provided via a wireless interface from an external device, the user input may be initiated via a user interface on/of the external device, such as a affordance or a touch sensitive display. Thus, in other words, the user may decide that it is time for a change of hearing mode, and may initiate this change the user input. It is an advantage that the request for changing hearing mode is received in response to a user input because it provides manual control to the user when the user wants to change hearing mode.

Additionally or alternatively, in some embodiments, the request for engaging in the first hearing mode is received in response to a determination based on the determined listening environment. Additionally or alternatively, in some embodiments, the request for engaging in the optimization mode is received in response to a determination based on the determined listening environment. Additionally or alternatively, in some embodiments, the request for engaging in the second hearing mode is received in response to a determination based on the determined listening environment. Thus, the request for engaging in a different hearing mode than the current hearing mode may be automatic. In response to the determined listening environment, the method may comprise the step of determining which hearing mode is the most optimum or preferred mode for the user. For example, if the determined listening environment is determined to be different than a previous determined listening environment, the difference may be above a threshold, the optimization mode may be automatically engaged. The method may comprises changing the hearing mode to a different hearing mode than the one currently engaged hearing mode in response to a change in determined listening environment above the threshold. It is an advantage that the request for changing hearing mode is received in response to a determination based on the determined listening environment because it provides an automatic change of hearing mode when needed, without the need for manual intervention.

In some embodiments, the request for engaging in the first hearing mode and/or the optimization mode and/or second hearing mode may be received in response to a user input and in response to a determination based on the determined listening environment. Thus, this is an advantage, as it both provides automatic change of hearing mode when needed, without the need for manual intervention, and at the same time, it provides manual control to the user when the user wants to change hearing mode.

In some embodiments, the method further comprises one or more hearing modes in addition to the above disclosed first hearing mode, second hearing mode, and optimization mode. Such additional hearing modes may be a third hearing mode, a fourth hearing mode, etc. The one or more additional hearing modes may be predetermined modes with a predetermined filter length and/or value representing the number of the one or more filter coefficients to be adapted per signal block, e.g. a third filter length and/or a third value, a fourth filter length and/or a fourth value. The one or more additional hearing modes may be configured so as to be regarded as optimal in a given situation. For example, the third hearing mode may be denoted “a restaurant/cocktail party mode”, while the fourth hearing mode may be denoted “a traffic mode”, and said third and fourth hearing modes may be configured to be suitable in such situation, which has been discussed above. The request for engaging in such additional hearing mode may follow the same considerations as for the first hearing mode and/or the second hearing mode and/or the optimization mode as discussed above. In other words, the request for engaging in such additional hearing modes In some embodiments, the determination based on the determined listening environment is performed using machine learning. Thus, in other words, the determination based on the determined listening environment regarding the request for engaging in the first hearing mode and/or optimization hearing mode and/or second hearing mode may be performed using machine learning, such as for example be a Markov model, a neural network or a statistical method. It is an advantage of using machine learning for the determination of changing hearing mode, because it may provide improved accuracy and efficiency in the determination.

Also disclosed is a binaural hearing device system. The system comprises a first hearing device for placement at, or in, a user’s first ear, the first hearing device comprises a first acoustic input transducer arrangement, a first signal processor, and a first wireless communication interface. The system comprises a second hearing device for placement at, or in, the user’s second ear, the second hearing device comprising a second acoustic input transducer arrangement, a second signal processor, and a second wireless communication interface. The first signal processor is configured to execute the steps of the disclosed method.

The present disclosure relates to different aspects including the first hearing device and the second hearing device and the binaural hearing device system described above and in the following, and corresponding device parts, each yielding one or more of the benefits and advantages described in connection with the first mentioned aspect, the disclosed method, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
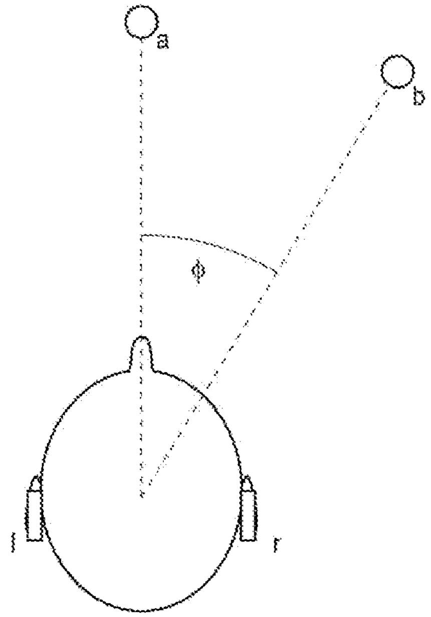
FIG. 1 schematically illustrates a top view of a user of a binaural hearing device system and casual sound sources as known in the prior art.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates a top view of a user of a binaural hearing device system and casual sound sources as known in the prior art. The user is wearing left and right hearing devices l and r, respectively, and is facing a first sound source a located on-axis, i.e. on a directivity axis of a beamformer or directional microphone arrangement present in each of the hearing devices. A second sound source b is placed off-axis by the angle $\phi$ with respect to the beamformers or directional microphone arrangements. The purpose of a bilateral beamforming signal based on the beamformers or directional microphone arrangements of the two hearing devices is to discriminate the off-axis sound source b in favor of the on-axis sound source a.

Figure 2:
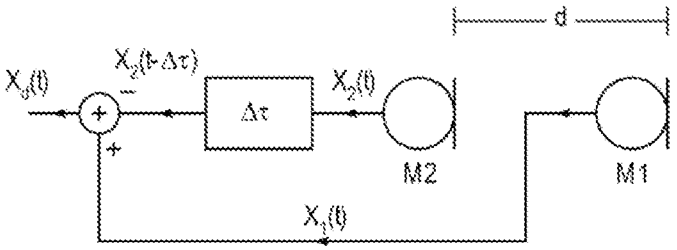
FIG. 2 schematically illustrates a prior art directional microphone assembly.

FIG. 2 schematically illustrates a prior art directional microphone assembly. The directional microphone arrangement comprises a front microphone M1, a rear microphone M2, a delay unit and a summing node. The front microphone M1 is placed a distance d from the rear microphone M2 relative to the directivity axis (not shown). The front microphone M1 provides an electric microphone signal $X_1(t)$ and the rear microphone M2 provides an electric microphone signal $X_2(t)$. The delay unit is configured to delay the signal $X_2(t)$ from the rear microphone M2 by a delay time $\Delta T$ corresponding to the time taken for an acoustic sound wave to propagate from the front microphone M1 to the rear microphone M2, resulting in the signal $X_2(t-\Delta T)$. This delayed signal is then subtracted from the signal $X_1(t)$ in the summing node, forming the directional microphone signal $X_d(t)$ for further processing.

Figure 3:
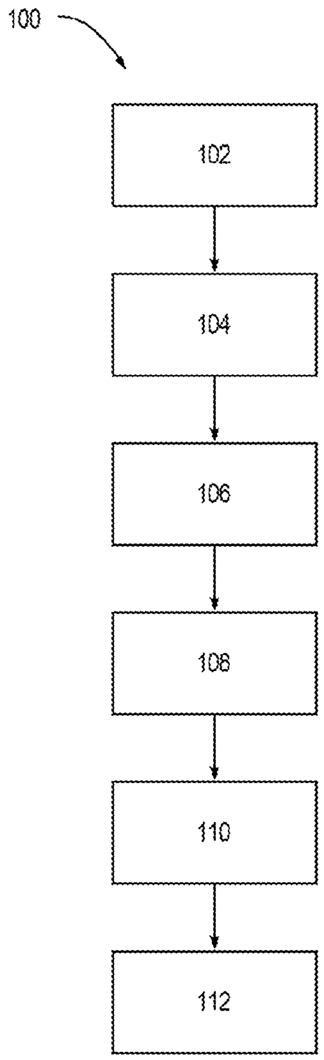
FIG. 3 is a flow chart illustrating an exemplary method at an exemplary binaural hearing device system.

FIG. 3 is a flow chart illustrating an exemplary method 100 at an exemplary binaural hearing device system according to the present disclosure. The system comprises a first hearing device for placement at, or in, a user's first ear. The first hearing device comprises a first acoustic input transducer arrangement, a first signal processor, and a first wireless communication interface. The system comprises a second hearing device for placement at, or in, the user's second ear. The second hearing device comprises a second acoustic input transducer arrangement, a second signal processor, and a second wireless communication interface. The method 100 comprises, at the first signal processor, generating 102 a first monaural beamforming signal based on one or more input transducer signals supplied by the first input transducer arrangement. The method comprises, at the first signal processor, receiving 104 a second monaural beamforming signal from the second hearing device via the first wireless communication interface. The method comprises, at the first signal processor, segmenting 106 the first and second monaural beamforming signals into a number of signal blocks. The method comprises, at the first signal processor, configuring 108 a variable length finite impulse response (FIR) filter to have a filter length comprising one or more filter coefficients. The method comprises, at the first signal processor, configuring 110 a coefficient-based adaptation strategy wherein a number of the one or more filter coefficients is to be adapted per signal block. The method comprises, at the first signal processor, computing 112 a first bilateral beamforming signal based on the first and second monaural beamforming signals. Computing 112 the first bilateral beamforming signal comprises an adaptive computation including the variable length FIR filter and the coefficient-based adaptation strategy.

Figure 4:
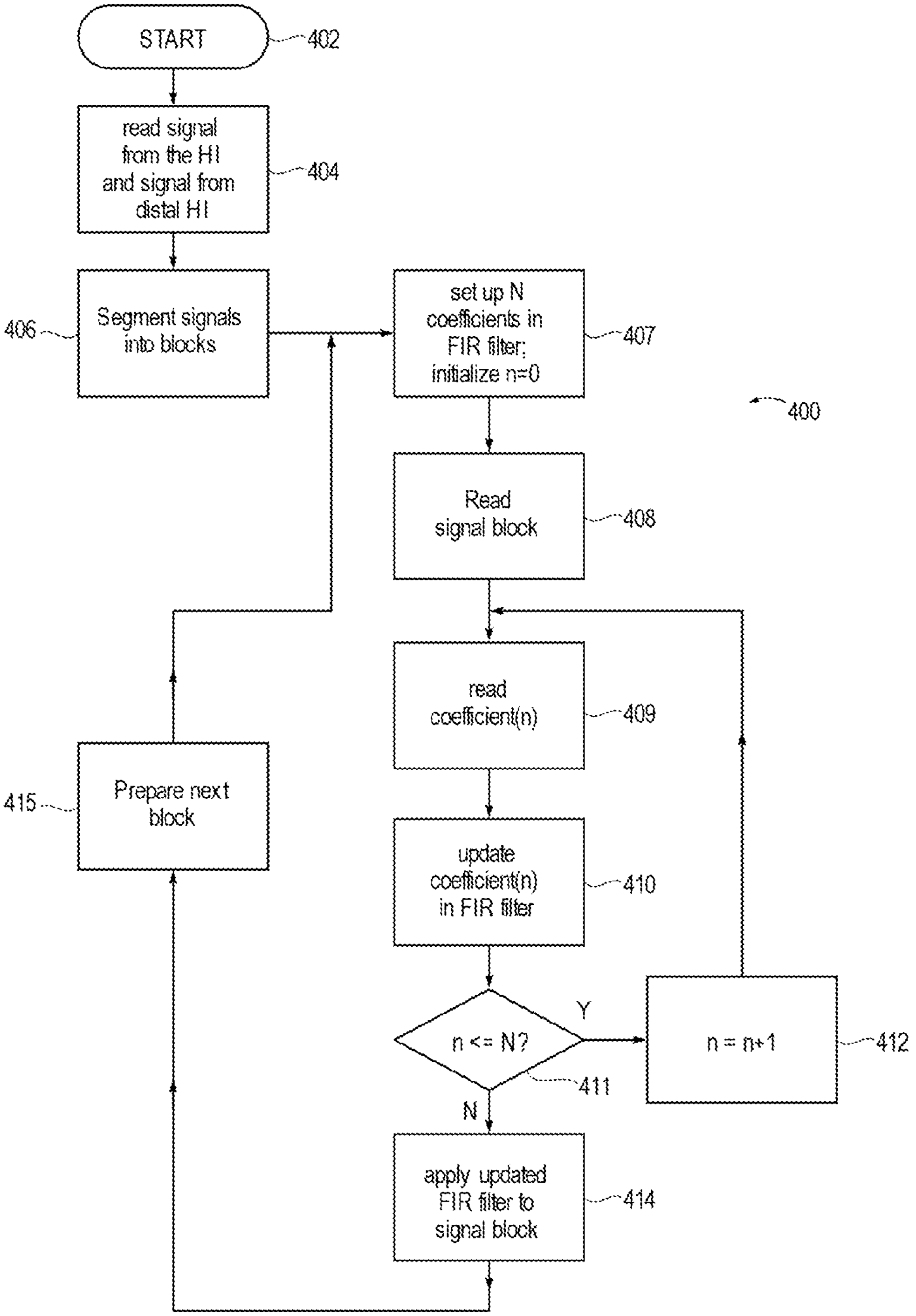
FIG. 4 is a flow chart illustrating an exemplary method at an exemplary binaural hearing device system.

FIG. 4 is a flow chart illustrating an exemplary method 400 at an exemplary binaural hearing device system according to some embodiments of the present disclosure. The binaural hearing device system comprises a first hearing device for placement at, or in, a user's first ear, the first hearing device comprising a first acoustic input transducer arrangement, a first signal processor, and a first wireless communication interface. The binaural hearing device system comprises a second hearing device for placement at, or in, the user's second ear, the second hearing device comprising a second acoustic input transducer arrangement, a second signal processor, and a second wireless communication interface. The method 400 comprises the following:

402: START. At the first processor:

404: Generating a first monaural beamforming signal based on one or more input transducer signals supplied by the first input transducer arrangement;

405: Segmenting the first and second monaural beamforming signals into a number of signal blocks;

406: Detecting a hearing mode in which the first hearing device is engaged. For example, the hearing device may be engaged in a first hearing mode, the first hearing mode comprising a first filter length for a FIR filter having a filter length comprising one or more filter coefficients and a first value representing the number of the one or more filter coefficients to be adapted per signal block in the first hearing mode. In this non-limiting illustrative example the first filter length is 20 filter coefficients, and the first value is denoted N. The number of the one or more filter coefficients to be adapted per signal block may be a same number as the one or more coefficients, or it may be a lower number that the one or more coefficients. Thus, in this non-limiting illustrative example, N≤20. If N<20, the other or remaining coefficients will be set to 0 (zero).

407: Configuring the FIR filter to have a filter length and configuring a coefficient-based adaptation strategy wherein a number of the one or more filter coefficients is to be adapted per signal block. In this non-limiting illustrative example, wherein the first hearing mode is engaged in the first hearing mode with a first filter length equal to 20 filter coefficient and the first value N, the FIR filter is configured to have the first filter length and the coefficient-based adaptation strategy comprises the first value representing the number of the 20 coefficients to be adapted per signal block. A counter is denoted n. The method comprises initializing the counter, n=0.

408: Reading a first signal block of the number of signal blocks.

409: Reading the n'th coefficient

410: Updating the n'th coefficient in the FIR filter. Configuring the coefficient-based adaptation strategy comprises updating the n'th coefficient out of the N coefficients to be adapted per signal block. Updating the n'th coefficient may be performed by using the optimization algorithm(s) discussed above.

411: Checking if the last coefficient is reached, thus if n≤N. If YES then proceed to 412. If NO then proceed to 414.

412: Setting n=n+1 and loop back to 409.

414: Applying updated FIR filter to signal block and computing a first bilateral beamforming signal based on the first and second monaural beamforming signals.

Figure 5:
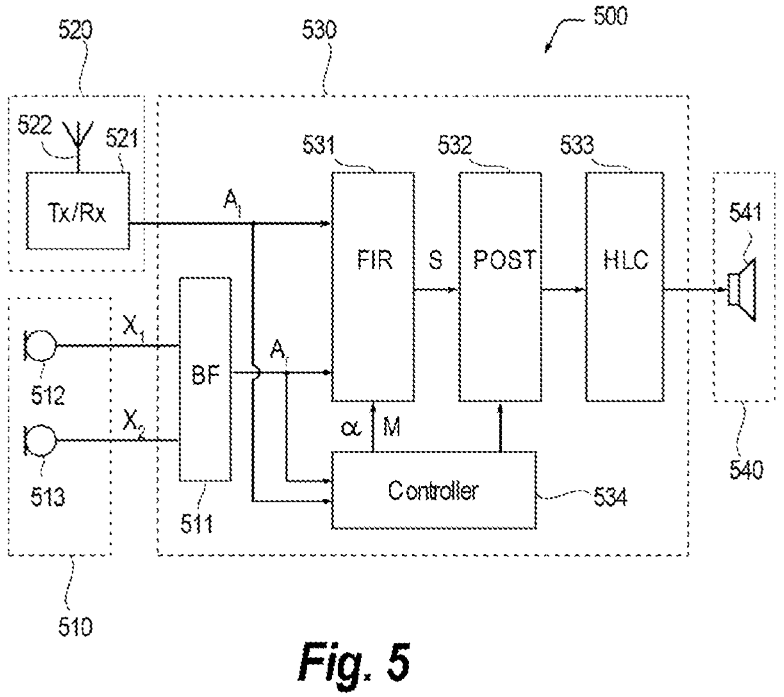
FIG. 5 schematically illustrates an exemplary first hearing device of an exemplary binaural hearing device system.

FIG. 5 schematically illustrates an exemplary first hearing device 500 of an exemplary binaural hearing device system according to some embodiments of the present disclosure. The binaural hearing device system further comprises a second hearing device (not shown). The first hearing device 500 comprises a first signal processor 530. The first signal processor 530 comprises a beamformer 511. The first hearing device comprises a first acoustic input transducer arrangement 510. The first acoustic input transducer arrangement 510 comprises a first omnidirectional microphone 512 which provides a microphone signal $X_1$ and a second omnidirectional microphone 513 which provides a microphone signal $X_2$, each microphone 512, 513 being coupled to the beamformer 511 generating a first monaural beamforming signal, $A_r$. Alternatively, or additionally, the first acoustic input transducer arrangement 510 may comprise a directional acoustic input transducer, such as a directional microphone arrangement as illustrated in FIG. 2. The first hearing device 500 comprises a first wireless communication interface 520. The first wireless communication interface 520 comprises an electrical antenna 522 configured for wireless communication. The first wireless communication interface 520 comprises a wireless communication unit 521. The first hearing device 500 is configured to communicate wirelessly via the first wireless communication interface 520 via the antenna 522 and the wireless communication unit 521. The first signal processor 530 is configured to receive a second monaural beamforming signal $A_l$ from the second hearing device (not shown) via the first wireless communication interface 520. The first monaural beamforming signal $A_r$ and the second monaural beamforming signal $A_l$ are input to the first signal processor 530 comprising an FIR filter unit 531, which is configured to compute a first bilateral beamforming signal S based on the first and second monaural beamforming signals $A_r$ and $A_l$, wherein computing the first bilateral beamforming signal S comprises an adaptive computation including a variable length FIR filter 531 and a coefficient-based adaptation strategy. The first signal processor 530 comprises a post processing filter 532 and a hearing loss compensation unit 533. In some embodiments the post processing filter 532 is omitted or at least temporarily dispensed with or by-passed. In some embodiments, the hearing loss compensation unit 533 is omitted or by-passed. The first signal processor comprises a controller 534. The first monaural beamforming signal $A_r$ and the second monaural beamforming signal $A_l$ are input to the controller 534. The controller 534 is configured to configure the variable length finite impulse response (FIR) filter 531 to have a filter length comprising one or more filter coefficients (M denotes the filter length). The controller 534 is configured to configure the coefficient-based adaptation strategy wherein a number of the one or more filter coefficients is to be adapted per signal block (a denotes the number of the one or more filter coefficients to be adapted by signal block). In some embodiments, the configuration of the variable length FIR filter 531 to have the filter length comprising one or more filter coefficients may be recurrently updated or recurrently configured. In some embodiments, the configuration of the coefficient-based adaptation strategy including the number of the one or more filter coefficients to be adapted per signal block may be recurrently updated or recurrently configured. Additionally or alternatively, in some embodiments, the configuration of the variable length filter and the configuration of the coefficient-based adaptation strategy may be dependent on a mode of the binaural hearing device system, such as a first hearing mode, a second hearing mode and/or an optimization mode. The first hearing device 500 comprises an output unit 540 comprising a output transducer 541. The output transducer 541 may be a receiver.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

1. A method at a binaural hearing device system, the system comprising:
   - a first hearing device for placement at, or in, a user's first ear, the first hearing device comprising a first acoustic input transducer arrangement, a first signal processor, and a first wireless communication interface; and
   - a second hearing device for placement at, or in, the user's second ear, the second hearing device comprising a second acoustic input transducer arrangement, a second signal processor, and a second wireless communication interface;
   - the method comprising:
     - at the first signal processor:
     - generating a first monaural beamforming signal based on one or more input transducer signals supplied by the first input transducer arrangement;
     - receiving a second monaural beamforming signal from the second hearing device via the first wireless communication interface;
     - segmenting the first and second monaural beamforming signals into a number of signal blocks;

configuring a variable length finite impulse response (FIR) filter to have a filter length comprising one or more filter coefficients;

configuring a coefficient-based adaptation strategy wherein a number of the one or more filter coefficients is to be adapted per signal block;

computing a first bilateral beamforming signal based on the first and second monaural beamforming signals, wherein computing the first bilateral beamforming signal comprises an adaptive computation including the variable length FIR filter and the coefficient-based adaptation strategy.

2. The method of item 1, wherein the variable length FIR filter is configured to equalize the first monaural beamforming signal and the second monaural beamforming signal.

3. The method of item 1, wherein the coefficient-based adaptation strategy comprises a value representing the number of the one or more filter coefficients to be adapted per signal block.

4. The method of any one of the preceding items, wherein the method further comprises receiving a request for engaging in an optimization mode, wherein a current listening environment is determined.

5. The method of item 3, wherein the method further comprises engaging in a first hearing mode: wherein the filter length is a first filter length configured to be a predetermined default filter length, and wherein the value representing the number of the one or more filter coefficients to be adapted per signal block is a first value configured to be a predetermined default value.

6. The method of item 4, wherein the optimization mode comprises, based on the determined listening environment, determining a second filter length comprising one or more filter coefficients.

7. The method of item 6, wherein the determination of the second filter length comprising one or more filter coefficients is performed using machine learning.

8. The method of items 3 and 4, wherein the optimization mode comprises, based on the determined listening environment, determining a second value representing the number of the one or more filter coefficients to be adapted per signal block.

9. The method of item 8, wherein the determination of the second value representing the number of the one or more filter coefficients to be adapted per signal block is performed using machine learning.

10. The method of any one of items 6-9, wherein the method further comprises a second hearing mode, wherein the filter length is the second filter length and/or wherein the value representing the number of the one or more filter coefficients to be adapted per signal block is the second value.

11. The method of any one of items 4-10, wherein the request for engaging in the first hearing mode and/or the optimization mode and/or second hearing mode is received in response to a user input.

12. The method of any one of items 4-11, wherein the request for engaging in the first hearing mode and/or the optimization mode and/or the second hearing mode is received in response to a determination based on the determined listening environment.

13. The method of the preceding items, wherein the determination based on the determined listening environment is performed using machine learning.

14. The method of any one of the preceding items, wherein the adaptive computation using the variable length FIR filter is a time-domain adaptive computation.

15. A binaural hearing device system, the system comprising:

a first hearing device for placement at, or in, a user's first ear, the first hearing device comprising a first acoustic input transducer arrangement, a first signal processor, and a first wireless communication interface;

a second hearing device for placement at, or in, the user's second ear, the second hearing device comprising a second acoustic input transducer arrangement, a second signal processor, and a second wireless communication interface; and wherein the first signal processor is configured to execute the steps of the method of any one of items 1-14.

16. A binaural hearing device system, the system comprising:

a first hearing device for placement at, or in, a user's first ear;

a second hearing device for placement at, or in, the user's second ear; and means adapted to execute the steps of the method of any one of the items 1-14.

17. A binaural hearing device system, the system comprising:

a first hearing device for placement at, or in, a user's first ear;

a second hearing device for placement at, or in, the user's second ear; and comprising means for carrying out the method of any one of the items 1-14.

18. A binaural hearing device system, the system comprising:

a first hearing device for placement at, or in, a user's first ear, the first hearing device comprising a first acoustic input transducer arrangement, a first signal processor, and a first wireless communication interface;

a second hearing device for placement at, or in, the user's second ear, the second hearing device comprising a second acoustic input transducer arrangement, a second signal processor, and a second wireless communication interface; and means adapted to execute the steps of the method of any one of the items 1-14.

19. A binaural hearing device system, the system comprising:

a first hearing device for placement at, or in, a user's first ear, the first hearing device comprising a first acoustic input transducer arrangement, a first signal processor, and a first wireless communication interface;

a second hearing device for placement at, or in, the user's second ear, the second hearing device comprising a second acoustic input transducer arrangement, a second signal processor, and a second wireless communication interface; and comprising means for carrying out the method of any one of the items 1-14.

The invention claimed is:

1. A method performed by a binaural hearing device system, the system comprising (1) a first hearing device for placement at, or in, a first ear of a user, the first hearing device comprising a first input transducer arrangement, a first signal processor, and a first wireless communication interface, and (2) a second hearing device for placement at, or in, a second ear of the user, the second hearing device comprising a second input transducer arrangement, a second signal processor, and a second wireless communication interface, the method comprising:

generating a first monaural beamforming signal by the first signal processor based on one or more input transducer signals provided by the first input transducer arrangement;

obtaining a second monaural beamforming signal provided by the second hearing device; and determining a first bilateral beamforming signal based on the first and second monaural beamforming signals, wherein the first bilateral beamforming signal is determined based on a variable length finite impulse response (FIR) filter, the FIR filter having a filter length;

wherein the first bilateral beamforming signal is based on α*l+β*r, wherein l is one of the first and second monaural beamforming signals, r is the other one of the first and second monaural beamforming signals, * represents a convolution operation, and α and β relate to the variable length FIR filter.

2. The method of claim 1, wherein the first bilateral beamforming signal is determined based on a first value representing a number of one or more filter coefficients to be adapted per signal block.

3. The method of claim 1, further comprising receiving a request for an optimization mode.

4. The method of claim 3, wherein the request for the optimization mode is based on a user input.

5. The method of claim 3, wherein the request for the optimization mode is based on a listening environment.

6. The method of claim 3, wherein the request is automatically generated.

7. The method of claim 3, wherein the filter length comprises a first filter length, and wherein the method further comprises determining a second filter length based on a current listening environment when in the optimization mode.

8. The method of claim 1, wherein when the binaural hearing device system is in a first mode, the filter length has a first filter length value, and/or a number of one or more filter coefficients to be adapted per signal block has a first value.

9. The method of claim 8, wherein the first filter length value has a predetermined default filter length value, and the first value of the number of the one or more filter coefficients to be adapted per signal block is a predetermined default value.

10. The method of claim 8, wherein when the binaural hearing device system is in a second mode, the filter length has a second filter length value, and/or wherein the number of the one or more filter coefficients to be adapted per signal block has a second value.

11. The method of claim 10, wherein the first mode and/or the second mode is based on a user input.

12. The method of claim 10, wherein the first mode and/or the second mode is based on a listening environment.

13. The method of claim 1, wherein a number of one or more filter coefficients to be adapted per signal block has a first value when the binaural hearing device system is in a first mode, and the number of the one or more filter coefficients to be adapted per signal block has a second value when the binaural hearing device system is in a second mode.

14. The method of claim 13, wherein the second value of the number of the one or more filter coefficients to be adapted per signal block is determined by machine learning.

15. The method of claim 1, further comprising determining a listening environment using machine learning.

16. The method of claim 1, wherein the determining the first bilateral beamforming signal comprises performing a time-domain adaptive computation.

17. The method of claim 1, wherein a number of the one or more filter coefficients to be adapted per signal block is same as, or is less than, a total number of all filter coefficients of the variable length FIR filter.

18. The method of claim 17, wherein the one or more filter coefficients are a subset of all filter coefficients of the variable length FIR filter, and wherein the method further comprises setting remaining coefficients that are not in the subset to a default value.

19. The method of claim 1, further comprising segmenting the first and second monaural beamforming signals into a number of signal blocks, wherein the number of the signal blocks is anywhere from 16 to 96.

20. The method of claim 1, further comprising updating a number of one or more filter coefficients to be adapted per signal block, wherein the act of updating is performed using a counter.

21. The method of claim 1, further comprising slowing down an adaptation convergence when there is a change of listening environment.

22. The method of claim 1, wherein the variable length FIR filter is configured to equalize a head-shadow effect between the first monaural beamforming signal and the second monaural beamforming signal.

23. The method of claim 1, wherein the variable length FIR filter is configured to equalize a beamforming difference between the first monaural beamforming signal and the second monaural beamforming signal.

24. The method of claim 1, further comprising adjusting a speed of convergence for computation of the first bilateral beamforming signal.

25. The method of claim 24, wherein the act of adjusting the speed of convergence comprises reducing the speed of convergence.

26. The method of claim 1, wherein α+β=1 in a first situation, and α+β=0 in a second situation.

27. A binaural hearing device system, comprising:

a first hearing device for placement at, or in, a first ear of a user, the first hearing device comprising a first input transducer arrangement, a first signal processor, and a first wireless communication interface; and a second hearing device for placement at, or in, a second ear of the user, the second hearing device comprising a second input transducer arrangement, a second signal processor, and a second wireless communication interface; and wherein the first signal processor is configured to:

generate a first monaural beamforming signal based on one or more input transducer signals provided by the first input transducer arrangement;

obtain a second monaural beamforming signal provided by the second hearing device; and determine a first bilateral beamforming signal based on the first and second monaural beamforming signals, wherein the first bilateral beamforming signal is determined based on a variable length finite impulse response (FIR) filter, the FIR filter having a filter length;

wherein the first bilateral beamforming signal is based on α*l+β*r, wherein l is one of the first and second monaural beamforming signals, r is the other one of the first and second monaural beamforming signals, * represents a convolution operation, and α and β relate to the variable length FIR filter.

28. The binaural hearing device system of claim 27, wherein the first signal processor is configured to slow down an adaptation convergence when there is a change of listening environment.

29. The binaural hearing device system of claim 27, wherein the variable length FIR filter is configured to equalize a head-shadow effect between the first monaural beamforming signal and the second monaural beamforming signal.

30. The binaural hearing device system of claim 27, wherein the variable length FIR filter is configured to equalize a beamforming difference between the first monaural beamforming signal and the second monaural beamforming signal.

31. The binaural hearing device system of claim 27, wherein the binaural hearing device system is configured to adjust a speed of convergence for computation of the first bilateral beamforming signal.

32. The binaural hearing device system of claim 31, wherein the binaural hearing device system is configured to adjust the speed of convergence by reducing the speed of convergence.

33. The binaural hearing device system of claim 27, wherein $\alpha+\beta=1$ in a first situation, and $\alpha+\beta=0$ in a second situation.

* * * * *